(12) United States Patent
Dardenne et al.

(10) Patent No.: US 9,608,694 B2
(45) Date of Patent: Mar. 28, 2017

(54) METHOD AND DEVICE FOR LOCATING AN IMPAIRMENT WITHIN A TELECOMMUNICATION LINE

(75) Inventors: Xavier Dardenne, Grez-Doiceau (BE); Benoît Drooghaag, Ophain-Bois-Seigneur-Isaac (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/358,564

(22) PCT Filed: Sep. 12, 2012

(86) PCT No.: PCT/EP2012/067833
§ 371 (c)(1),
(2), (4) Date: May 15, 2014

(87) PCT Pub. No.: WO2013/120547
PCT Pub. Date: Aug. 22, 2013

(65) Prior Publication Data
US 2014/0314134 A1    Oct. 23, 2014

(30) Foreign Application Priority Data
Feb. 16, 2012  (EP) .................................. 12305179

(51) Int. Cl.
*H04B 3/46*     (2015.01)
*H04B 3/487*    (2015.01)

(52) U.S. Cl.
CPC .............. *H04B 3/464* (2013.01); *H04B 3/46* (2013.01); *H04B 3/487* (2015.01)

(58) Field of Classification Search
CPC .................................. H04B 3/46; H04B 3/487
See application file for complete search history.

(56) References Cited

U.S. PATENT DOCUMENTS

| 5,570,029 A | 10/1996 | Bottman et al. |
| 6,970,560 B1 | 11/2005 | Hench et al. |

(Continued)

FOREIGN PATENT DOCUMENTS

| CN | 1965498 A | 5/2007 |
| CN | 101047405 A | 10/2007 |

(Continued)

OTHER PUBLICATIONS

International Search Report PCT/ISA/210 for International Application No. PCT/EP2012/067833 Dated Oct. 10, 2012.

(Continued)

*Primary Examiner* — Khaled Kassim
*Assistant Examiner* — Syed S Ali
(74) *Attorney, Agent, or Firm* — Harness, Dickey & Pierce, P.L.C.

(57) ABSTRACT

A method for locating an impairment within a telecommunication line may include determining measurement data related to the telecommunication line and estimating a location of the impairment depending on the measurement data. The measurement data includes crosstalk data including at least one transfer function element of a crosstalk matrix. The transfer function element characterizes a crosstalk transfer function from the telecommunication line towards the at least one further telecommunication line, and the method includes detecting oscillations in the crosstalk transfer function.

10 Claims, 4 Drawing Sheets

(56) References Cited

U.S. PATENT DOCUMENTS

| | | | | |
|---|---|---|---|---|
| 2006/0251221 | A1* | 11/2006 | Rosenberg | H04B 3/493 379/22.01 |
| 2007/0014393 | A1* | 1/2007 | Jensen | G01R 27/04 379/30 |
| 2007/0183488 | A1* | 8/2007 | Kang | H04M 11/062 375/222 |
| 2007/0274404 | A1* | 11/2007 | Papandriopoulos | H04B 3/32 375/260 |
| 2008/0267392 | A1 | 10/2008 | Raheja et al. | |
| 2008/0292064 | A1* | 11/2008 | Wu | H04M 1/24 379/22.04 |
| 2008/0320541 | A1 | 12/2008 | Zinevich | |
| 2009/0092036 | A1 | 4/2009 | Peeters et al. | |
| 2010/0046593 | A1* | 2/2010 | Schenk | H04B 3/487 375/222 |
| 2011/0025343 | A1* | 2/2011 | Noessing | H04M 3/30 324/543 |
| 2011/0058468 | A1* | 3/2011 | Singh | H04M 3/304 370/201 |
| 2011/0206101 | A1* | 8/2011 | Matza | H04B 3/487 375/222 |
| 2012/0039187 | A1* | 2/2012 | Yang | H04B 3/46 370/249 |
| 2012/0069883 | A1* | 3/2012 | Fertner | H04B 3/46 375/222 |
| 2012/0163559 | A1* | 6/2012 | Fertner | H04B 3/466 379/24 |
| 2012/0219123 | A1* | 8/2012 | Berg | H04B 3/487 379/27.01 |
| 2013/0010931 | A1* | 1/2013 | Berg | H04B 3/487 379/22 |
| 2014/0294054 | A1* | 10/2014 | Kim | H04B 3/32 375/225 |
| 2015/0180596 | A1* | 6/2015 | Berg | H04B 3/46 375/224 |

FOREIGN PATENT DOCUMENTS

| | | |
|---|---|---|
| EP | 0675607 A2 | 10/1995 |
| JP | S6023773 A | 2/1985 |
| JP | H047292 A | 1/1992 |
| KR | 100144436 | 8/1998 |
| WO | WO-2011053207 A1 | 5/2011 |

OTHER PUBLICATIONS

Written Opinion of the International Searching Authority PCT/ISA/237 for International Application No. PCT/EP2012/067833 dated Oct. 10, 2012.

* cited by examiner

METHOD AND DEVICE FOR LOCATING AN IMPAIRMENT WITHIN A TELECOMMUNICATION LINE

This application is the national phase under 35 U.S.C. § 371 of PCT International Application No. PCT/EP2012/067833 which has an International filing date of Sep. 12, 2012, which claims priority to European patent application No. EP 12305179.9 filed Feb. 16, 2012; the entire contents of each of which are hereby encorporated by reference.

FIELD OF THE INVENTION

The present invention refers to a method for locating an impairment within a telecommunication line. Furthermore, the invention refers to an impairment localization device arranged for locating an impairment within a telecommunication line and a computer program product programmed for executing the method for locating the impairment.

BACKGROUND

It is known to perform Single Ended Line Testing (SELT) in Digital Subscriber Lines (DSL). SELT comprises reflectometry-based measurement procedures that allow for determining a location of an impairment in a pair of conductors of a subscriber line. Typically, the impairment reflects a signal transmitted over the subscriber line. Thus the location of a the impairment can be determined by measuring a signal propagation time from a single end of the subscriber line to the impairment and back to that single end of the DSL. However, SELT requires a special test signal be transmitted over the subscriber line and normal operation of the subscriber line must be interrupted during SELT. Therefore, SELT is not well-suited for repeated or automatic tests of the subscriber line.

Furthermore, DSL systems typically provide procedures for Dual Ended Line Testing (DELT). DELT is carried out by two nodes connected to the different end points of the DSL, e. g. by an access node and a node that is part of the Customer Premises Equipment (CPE). Results of the DELT can be retrieved from nodes at end points of the subscriber line by means of the Simple Network Management Protocol (SNMP).

In addition, it is known to adapt data transmission over multiple telecommunication lines that extend at least partly in a common binder, to crosstalk between these multiple telecommunication lines. This adaptive transmission is often referred to as "vectoring". When performing vectoring, the crosstalk between the telecommunication lines is measured and signals transmitted over the individual telecommunication lines are precoded depending on the measured crosstalk in order to eliminate a disturbing effect of crosstalk between the telecommunication lines.

SUMMARY

The object of the present invention is to provide a method, a device, and a computer program product that allows to detect an impairment in the telecommunication line and to precisely and reliably estimate a location of the impairment without interrupting the normal operation of the telecommunication line. This object is solved by a method according to claim 1, an impairment localization device according to claim 8, and a computer program product according to claim 10.

According to a preferred embodiment of the present invention, a method for locating an impairment within a telecommunication line is provided, the method comprising determining measurement data related to the telecommunication line and estimating a location of the impairment depending on the measurement data, wherein said measurement data comprise crosstalk data that characterize crosstalk between the telecommunication line and at least one further telecommunication line. Because the impairment affects crosstalk between the telecommunication line and a neighbouring further line, preferably residing within the same binder as the impaired line, the crosstalk can be used for detecting the location. Moreover, the location of the impairment within the telecommunication line has an influence on the crosstalk data. Thus, the crosstalk data can be used to estimate the location of the impairment more precisely.

An impairment is any type of asymmetrical defect or degradation of the telecommunication line, which affects the line asymmetrically and therefore causes mode conversions within the line. For example the impairment can be a shunt resistance between an electrical conductor of the line and a conductor of another line, a shunt resistance to ground, a series resistance within an electrical conductor of the line, a shunt capacitance between an electrical conductor of the line and an electrical conductor of another line, a shunt capacitance to ground, or a series capacitance within an electrical conductor of the line. Furthermore, the line may have an impairment in the form of a short circuit between a conductor of the line and a conductor of another line or in the form of an open wire (i.e. interrupted conductor). Impairments of the short circuit type and the open wire type are special cases of a shunt resistance and series resistance, respectively.

In an embodiment, the crosstalk data comprise at least one transfer function element of a crosstalk matrix, the transfer function element characterizing a crosstalk transfer function between the telecommunication line and at least one other telecommunication line in the same vectoring group.

Furthermore, in an embodiment, determining measurement data comprises requesting the at least one transfer function element from a network element, preferably from a network element (e.g. access node, DSLAM, or DSL modem) to which an end of the telecommunication line is connected. Typically this network element performs—at least in certain phases during operation—measurements in order to determine transmission characteristics of the telecommunication line. These measurements may determine measurement data that characterize a transfer function of the telecommunication line and/or crosstalk between the line and least one further line. In some embodiments, the magnitude of the transfer function of the telecommunication line is represented in a logarithmic scale. Corresponding measurement data is often referred to as H log data. The measurement data may be determined during a Dual End Line Test (DELT) procedure. A DELT procedure may be carried out during certain phases of the operation of the line, for example when a node, to which the line is connected, is powered on or after an interruption of a connection between nodes that should normally be connected to each other by the telecommunication line. A communication protocol, such as the Simple Network Management Protocol (SNMP) or the Trivial File Transfer Protocol (TFTP) can be applied to retrieve the measurement data from the network element. Using a communication protocol allows to execute the method on a device different then a network element that is connected the telecommunication line. However, the method can also be executed directly on a network element connected to the line.

In an embodiment, the method comprises detecting oscillations in the crosstalk transfer function. Preferably, the method may comprise determining that the impairment is present in the line if the oscillations in the crosstalk transfer function have been detected. In an embodiment, the method comprises estimating the location of the impairment depending on said detecting. The crosstalk transfer function shows oscillations in the frequency domain if the telecommunication line has an impairment. An amplitude of these oscillations depends on the location of the impairment. Therefore, the location of the impairment can be estimated particularly easily by analysing the crosstalk transfer function described by the transfer function element of the crosstalk matrix.

In order to be able to detect the impairment and/or to determine a set of possible locations of the impairment, in an embodiment, the measurement data comprise direct transfer function data characterizing a direct transfer function of the telecommunication line. The direct transfer function data may include H log data. The direct transfer function data may be used to detect the impairment and/or to determine e.g. two possible locations.

In an embodiment, the method comprises determining that the impairment is present in the line if at least one oscillation of the direct transfer function is detected. The at least one oscillation is caused by the impairment. Using the direct transfer function allows to detect the impairment particularly reliably. However, in another embodiment, a different approach is applied for detection of the impairment; for example, the crosstalk data may be used for detecting the impairment, e.g. by checking whether the crosstalk transfer function has the oscillations caused by the impairment.

In an embodiment, the method comprises determining possible locations of the impairment, preferably depending on the direct transfer function, and selecting one of said possible locations as an estimated location of the impairment depending on an amplitude of the oscillations of the crosstalk transfer function.

In an embodiment, the method may comprise selecting the possible location that is closest to a signal source of a signal fed into the telecommunication line as the estimated location if the amplitude of the oscillations is greater than a threshold or equal to the threshold.

In another embodiment, the method comprises determining a ratio between the amplitude of oscillations of the crosstalk transfer function and an amplitude of oscillations of the transfer function of the telecommunication line and selecting the possible location that is closest to the signal source as the estimated location if said ratio is greater or equal to a predefined threshold.

In an embodiment, the method comprises determining at least one periodicity interval, preferably two periodicity intervals, of the at least one oscillation of the direct transfer function, wherein the possible locations are determined depending on said detecting. The at least one periodicity interval is caused by transmission mode conversions at the location of the impairment, which in turn introduce multiple signal propagation paths within the telecommunication line. A load connected to the telecommunication line sees a resulting signal that corresponds to the superposition of signals transmitted along the individual propagation paths. Since the signal propagation paths depend on the location of the impairment and thus influence the superposition of the signals, the possible locations can be determined depending on the at least one periodicity interval.

According another embodiment of the present invention, an impairment localization device arranged for locating an impairment within a telecommunication line is provided, the device comprising a controller arranged for determining measurement data related to the telecommunication line and estimating a location of the impairment depending on the measurement data, wherein said measurement data comprise H log of the telecommunication line and/or crosstalk data that characterize crosstalk between the telecommunication line and at least one further telecommunication line. The impairment localization device may be a computing device such as a server, a personal computer, a handheld computer, or the like. In an embodiment, the impairment localization device is a server computer connected to a telecommunication network, wherein the telecommunication line belongs to this telecommunication network.

In an embodiment, the device, in particular the controller, is arranged, preferably programmed to execute a method according to the present invention, embodiment of which are herein described.

In an embodiment, the device is part of a network element connected to the telecommunication line, preferably an access node or a customer premises node, or part of a monitoring station that is arranged for communicating with the network element.

According to yet another preferred embodiment of the present invention, a computer program product, preferably a storage medium, comprising a computer program, is provided, wherein the computer program is programmed for executing a method according to the invention, embodiments of which are herein described. When executing the computer program on a computer, in particular the controller of the impairment detection device, the computer executes a method according to the invention. Said storage medium may be semiconductor memory such as flash memory, a magnetic medium such as a magnetic disc or tape, or optical storage media like optical discs. The computer program product can be provided by a server for download.

BRIEF DESCRIPTION OF THE FIGURES

Exemplary embodiments and further advantages of the present invention are shown in the Figures and described in detail hereinafter.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
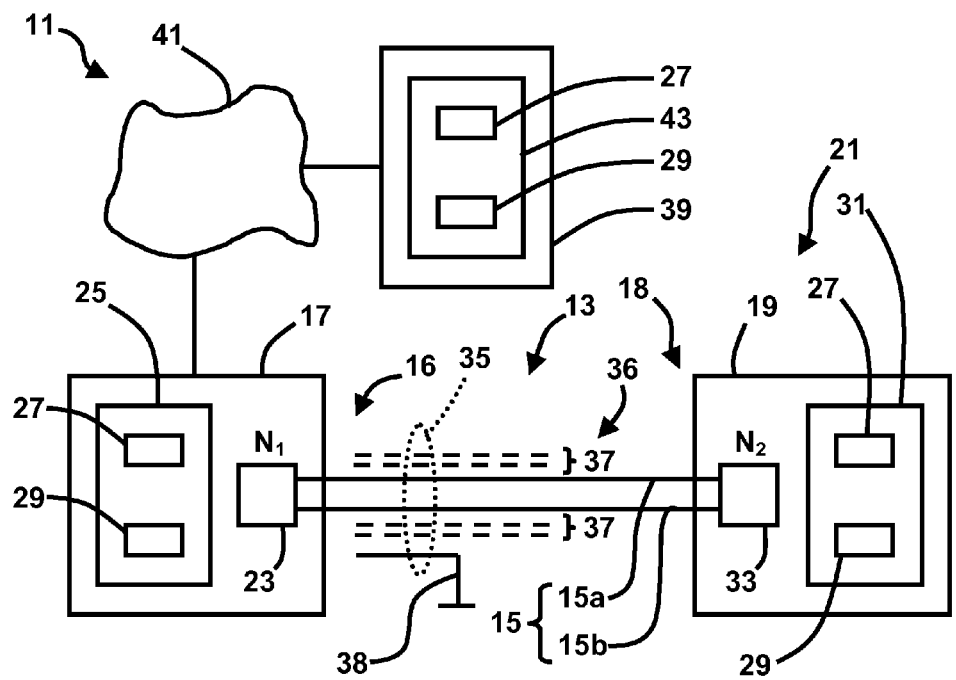
FIG. 1 shows a communication network.

FIG. 1 shows a communication network 11 comprising a telecommunication line 13. The telecommunication line 13 has a pair 15 of electrical conductors 15a, 15b with a first end 16 of the pair 15 being connected to a network side termination node of the network 11, further referred to as access node 17, and a second end 18 of the pair 15 being connected to a terminal side termination node 19 of the network 11. The terminal side termination node 19 may be part of customer premises equipment (CPE 21) of the network 11.

In the shown embodiment, the telecommunication line 13 is a Digital Subscriber Line (DSL), such as an ADSL, a VDSL or the like. Consequently, the access node 17 may be a DSL Access Multiplexer (DSLAM) or another type of DSL access node. The terminal side termination node 19 may be a DSL modem or include a DSL modem. However, the present invention is not limited to DSL. In another embodiment, the network 11 comprises a different type of telecommunication line 13.

The access node 17 has first modem circuitry 23 to which the first end 16 of the pair 15 is connected. In addition, the access node 17 has a first controller 25 adapted for controlling the operation of the access node 17. In an embodiment, the first controller 25 is a programmable computer comprising a processor 27, e. g. a microprocessor, and a storage element 29, e.g. semiconductor memory.

The terminal side termination node 19 includes second modem circuitry 33 to which the second end 18 of the pair 15 is connected. Furthermore, the terminal side termination node 19 comprises a second controller 31. The second controller 31 may have the same basic configuration as the first controller 25, i.e. the second controller 31 may be a programmable computer and comprise a processor 27 and/or a storage element 29.

In the shown embodiment, at least a part of the pair 15 is part of a binder 35 and extends in parallel to at least one further telecommunication line 36. Each further line 36 comprises a further conductor pair 37. The binder 35 may comprise an electrically conductive, preferably metallic, shielding 38 that may be grounded as depicted in FIG. 1.

Furthermore, the network 11 may comprise an optional monitoring station 39 connected e. g. via a interconnection network 41 to at least one of the nodes 17, 19 such that the station 39 can communicate with at least one of the nodes 17, 19, preferably the access node 17. The station 39 comprises a third controller 43. The third controller 43 may have the same basic configuration as the first controller 25, i.e. the third controller 43 may be a programmable computer and comprise a processor 27 and/or a storage element 29. In an exemplary embodiment, the station 39 may be a server computer, a personal computer, a handheld computer such as a PDA or cell phone, etc.

At least one of the controllers 25, 31, or 43 is arranged for executing a method for identification of an impairment within the telecommunication line 13, in particular within the pair 15 of conductors 15a, 15b. To this end, a computer program may be provided that is programmed such that at least one of the controllers 25, 31, 43 executes the method when running said computer program. In other words, the method may be executed on the access node 17, on the station 39, or the terminal side termination node 19. The computer program may be stored on at least one storage element 29. In addition, the computer program may be stored on any type of data storage media such as magnetic or optical disk or semiconductor storage media. Furthermore, the program can be provided by a server for transmission over a network, preferably the Internet.

Figure 2:
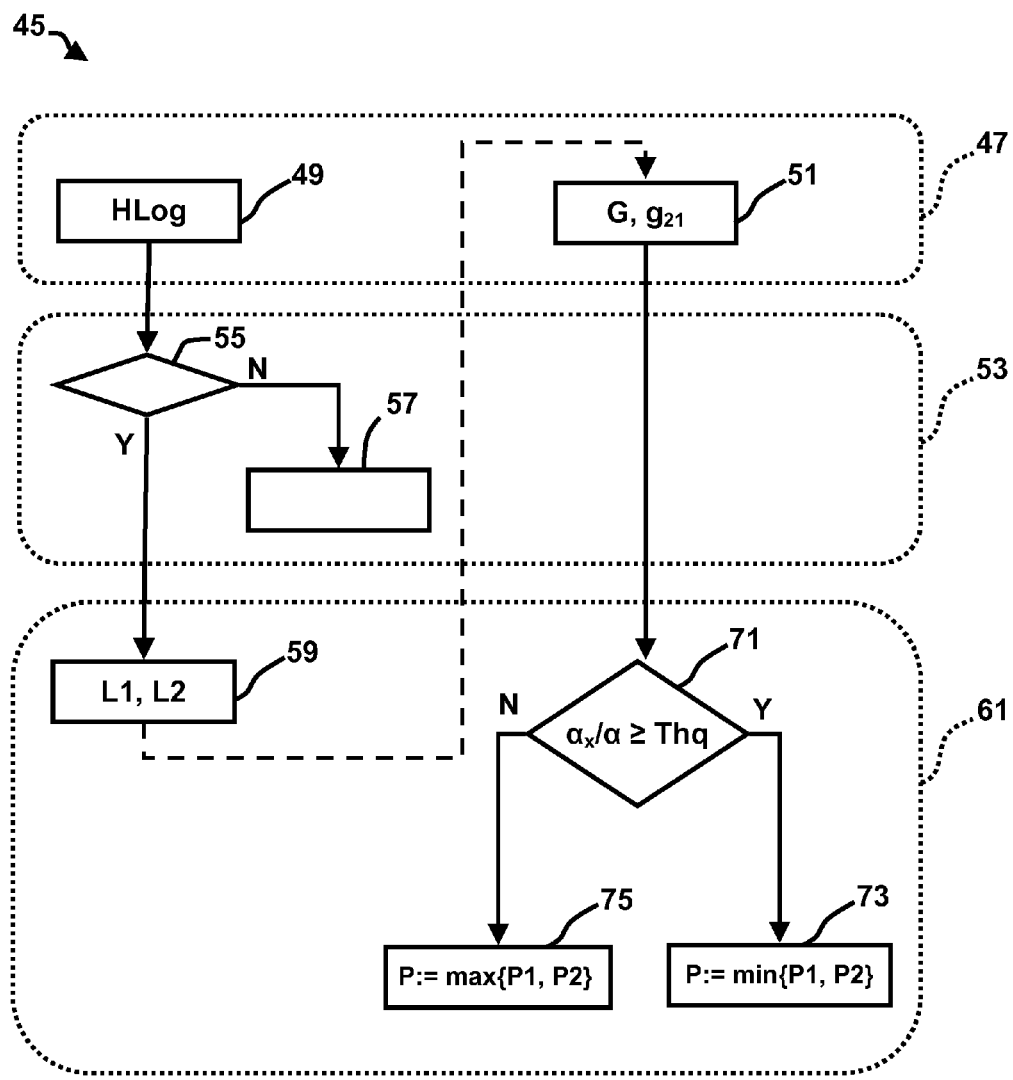
FIG. 2 shows a flow chart of a method for locating an impairment within the telecommunication line of the network shown in FIG. 1.

FIG. 2 shows the method 45 in detail. The method 45 comprises a measurement block 47 for retrieving measurements related to the telecommunication line 13, in particular to the pair 15. For example, the measurement block 47 may comprise a step 49 for retrieval of first measurement data H log. In the shown embodiment, the first measurement data H log characterize the magnitude of a transfer function between the two ends 16, 18 of the pair 15 preferably in a logarithmic scale. For example, the first measurement data H log may include multiple values of the magnitude of the transfer function, with each value corresponding to a different frequency of a signal to be transmitted over the pair 15.

Furthermore, the measurement block 47 includes a step 51 that retrieves second measurement data that characterize crosstalk between the telecommunication line 13, i.e. the pair 15, and at least one further telecommunication line. For instance, the second measurement data may include a crosstalk matrix G or at least one crosstalk coefficient $g_{ij}$ thereof. The indices of the crosstalk coefficients indicate the individual line 13, 36. As shown in FIG. 2, step 51 may be executed after step 59. In another embodiment, step 51 is executed independently from step 59, i.e. in parallel to step 49. In general, the order of execution of the steps of the method 45 may vary in different embodiments.

A coefficient $g_{ij}$, $i \neq j$ of the crosstalk matrix G characterizes crosstalk between line i and line j typically located at least partially within the same binder 35. For example, if the line 13 has the index i=1 and one of the further lines 36 has the index j=2 then the crosstalk, e.g. the far-end crosstalk (FEXT), from the line 13, towards that further line 36 is characterized by the crosstalk coefficient $g_{21}$. The diagonal coefficients of the crosstalk matrix G are zero, i.e. $g_{ii}$=0. A crosstalk transfer function may be applied to describe the crosstalk. In this case, the coefficient $g_{ij}$ is frequency dependent. For instance, the coefficient $g_{ij}$ may be itself a vector, the elements $g_{ijf}$ of which describe the magnitude and/or the phase of the crosstalk transfer function for different discrete frequencies f. When using frequency dependent coefficients $g_{ij}$ in the form of vectors, the crosstalk matrix G is three-dimensional.

In a preferred embodiment, the first modem circuitry 23 and/or the second modem circuitry 33 use vectoring in order to cancel the disturbing effect of crosstalk. Said vectoring comprises performing measurement of transmission characteristics of the lines 13, 36 and estimating the crosstalk matrix G or at least one crosstalk coefficient $g_{ij}$ of the crosstalk matrix G based on these measurements. The telecommunication lines 13, 36 that are considered when performing vectoring form a vectoring group. In an embodiment, the crosstalk matrix describes the crosstalk between the telecommunication lines of a single vectoring group.

In case of N signals $S_1, \ldots, S_N$ transmitted over N different telecommunication lines belonging to the same vectoring group and N received signals $R_1, \ldots, R_N$, the following equation indicates the received signals $$R = \begin{pmatrix} r_1 \\ \vdots \\ r_N \end{pmatrix} \quad (1)$$

$$= (D+G) \cdot \begin{pmatrix} s_1 \\ \vdots \\ s_N \end{pmatrix}$$

$$= (D+G) \cdot S$$

$$= D \cdot (I + G') \cdot S$$

where S and R are vectors representing the transmitted and received signals, respectively. D stands for a diagonal matrix, the coefficients $d_{ii}$, i=1, ..., N represent the transfer function of line i, further referred to as direct transfer function. The remaining coefficients of D are zero, i.e. $d_{ij}=0$ for i≠j. The matrix G' depends on the crosstalk matrix, $G'=D^{-1}G$.

When using vectoring, a precoded signal $X=(I+G')^{-1} S=P S$ is transmitted instead of the signal S, where I stands for the unit matrix and P is a precoding matrix used to transform the original signal S to be transmitted into the actually transmitted precoded signal X.

When substituting S with X in equation (1) then the following received signal vector is obtained $$R=D \cdot S. \quad (2)$$

The crosstalk matrix G does not appear in equation (2) anymore, that is the crosstalk has been cancelled by means of precoding using the precoding matrix P.

According to an embodiment of the present invention, at least one crosstalk coefficient $g_{ij}$ of the crosstalk matrix G, which is determined for the purpose of vectoring, is used to estimate the location of an impairment in one telecommunication line 13 in the vectoring group of N transmission lines. In particular, an ambiguity of the location can be resolved by selecting one location from a set of multiple, typically two, possible locations, as will be described in detail below.

Moreover, the method 45 comprises a fault detection block 53 for determining whether the line 13 has an impairment or not. A first branch 55 of the fault detection block 53 determines whether the direct transfer function characterized by the first measurement data H log has oscillations. If such oscillations have not been detected (N) then the method 45 branches to a step 57. In step 57, the method 45 determines that the telecommunication line 13 has no impairments. If such oscillations have been detected (Y) then the method 45 determines that there is an impairment in the line 13 and continues with a step 59.

In another embodiment, the first branch 55 comprises determining whether the line 13 has an impairment depending on the crosstalk. For instance, the first branch 55 may detect an impairment if an average crosstalk level between the line 13 and another line is higher than an expected crosstalk level, e.g. higher than a predefined crosstalk threshold. In an embodiment, determining 55 whether the line 13 has an impairment depends on the crosstalk only without relying on the direct transfer function, i.e. the first measurement data H log.

In another embodiment, the first branch 55 comprises determining whether some of the crosstalk matrix elements have oscillations in the frequency domain. If such oscillations are detected in the element $g_{ij}$ of the crosstalk matrix, then the method 45 determines that the line j has an impairment.

Step 59 belongs to an impairment localization block 61 of the method 45. The impairment localization block 61 serves to estimate a location P of the impairment. To this end, step 59 determines periodicities $\Delta f_1$ and $\Delta f_2$ of oscillations of the direct transfer function of the line 13.

In a preferred embodiment, the approach described in the European patent application EP 12305036 filed on Jan. 10, 2012 is used. That is, two distances $L_1$ and $L_2$ are calculated using the equations $$\Delta f_1 = \frac{v}{2L_1} \quad (3)$$

and $$\Delta f_2 = \frac{v}{2L_2}.$$

In these equations, v stands for the phase velocity. As described in detail in EP 12305036, $L_1$ and $L_2$ can be interchanged without affecting the result. That is there are two possible locations $P_1$, $P_2$ according to the two possible assumptions regarding the values of $L_1$ and $L_2$. As a consequence, step 59 calculates a first possible location $P_1$, which is located by the distance $L_1$ away from the first end 16 of the line 13 and a second possible location $P_2$ that is located by the distance $L_2$ away from the first end 16 of the line 13. In the examples described herein, the location of a signal source 78 (see FIG. 5) is a point of origin regarding the location, i.e. the signal source is at the location 0, and a signal load 83 is at the location L.

Figure 3:
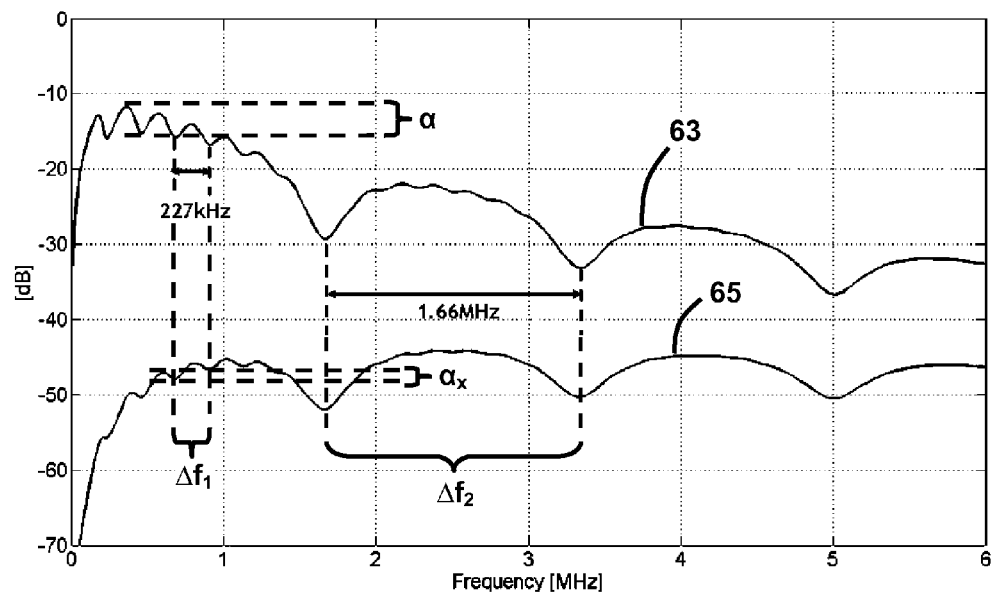
FIG. 3 shows a diagram of a direct transfer function of the telecommunication line and a crosstalk transfer function in case of an open wire impairment close to a signal source connected to the telecommunication line.
Figure 4:
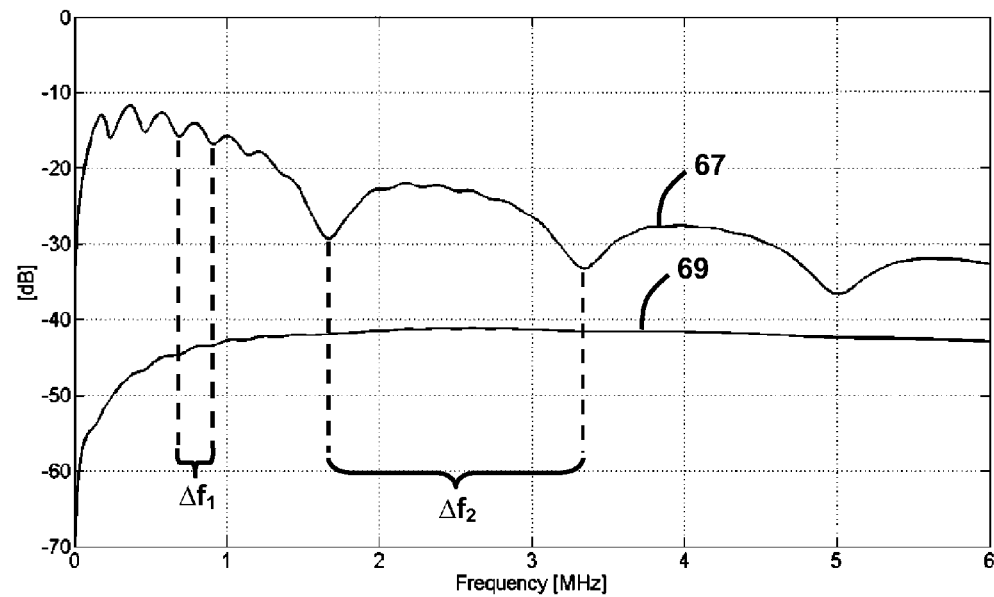
FIG. 4 shows a diagram similar to FIG. 3 in case of the open wire impairment close to a signal load connected to the telecommunication line.

FIG. 3 shows a direct transfer function (curve 63) of the line 13 in case of an impairment in the form of an open wire close to the signal source 78 and a corresponding crosstalk transfer function (curve 65). FIG. 4 shows both the direct transfer function (curve 67) as well as the crosstalk transfer function (curve 69) in case of an open wire impairment close to the load 83 of the transmission line 13. In the shown examples, a signal source is connected during a measurement procedure such as DELT to the first end 16 and the load is connected to the second end 18 of the line 13. In both examples, the length of the line 13 is 500 m. In FIG. 3, the distance between the signal source and the impairment is 60 m. In FIG. 4, the distance between the impairment and the signal sink is 60 m.

When analyzing the exemplary direct transfer function 63 shown in FIG. 3, step 59 determines the periodicities Δf1, Δf2 and calculates the distances $L_1$=60 m and $L_2$=440 m using the equations (3). Thus, there are two possible locations $P_1$=60 m and $P_2$=440 m of the impairment. When analyzing the other exemplary direct transfer function 67 shown in FIG. 4, step 59 determines the same periodicities Δf1, Δf2 although the impairment is located at a different position within the line than in FIG. 3.

In another embodiment, the possible locations P1, P2 are determined depending on the crosstalk transfer functions 65, 69, e.g. by determining the periodicities Δf1, Δf2 of the crosstalk transfer function. As can be seen from the Figures, the crosstalk transfer functions 65, 69 have the same oscillations as the direct transfer functions 63, 67. Consequently, the same approach for determining the possible locations P1, P2 can be used in connection with the crosstalk transfer functions 65, 69 rather than in connection with the direct transfer functions 63, 67. In this embodiment, the possible locations are determined depending on the second measurement data G only without relying on the first measurement data H log.

In yet another embodiment, both the direct transfer function 63, 67 as well as the crosstalk transfer function 65, 69 are analyzed by using the first measurement data H log and the second measurement data G. Using the first measurement H log data allows for determining the possible locations $P_1$, $P_2$ more precisely or reliably in particular in situations where the oscillations in the crosstalk transfer function have a comparatively low amplitude such as the crosstalk transfer function 69 depicted in FIG. 4.

In order to determine the most probable location P of the impairment, a second branch 71 of the location block 61 checks whether oscillations in the crosstalk transfer function 65, 69 are present to a certain extent.

In a preferred embodiment, the amplitude α of the direct transfer function, preferably the maximum amplitude, and the amplitude $α_x$ of the crosstalk transfer function, preferably the maximum amplitude of the crosstalk transfer function, are determined. A ratio $q=α_x/α$ is calculated. If this ratio q is close to 1 then (Y) a step 73 is executed that determines that the impairment is located closer to the signal source 78 than to the signal load 83, e.g. by selecting the smaller value of $P_1$ and $P_2$ as the most probable location P of the impairment. If this ratio q is close to 0 then a step 75 is executed that determines that the impairment is located closer to the signal load 83 than to the signal source, e.g. by selecting the larger value of $P_1$ and $P_2$ as the most probable location P of the impairment. For example, the ratio q may be compared with a predefined ratio threshold Thq. If q≥Thq then step 73 may be executed, otherwise step 75 may be executed. In an exemplary embodiment, the threshold Thq may in the range from 0 to 1, in particular e.g. from 0.3 to 0.7, preferably 0.4 to 0.6. In an embodiment, the threshold Thq is approximately 0.5 or exactly 0.5. However, the exact value of the threshold Thq may be chosen depending on conditions or requirements related to a concrete implementation of the present invention.

In another embodiment, the amplitude $α_x$ of the crosstalk transfer function 65, 69, preferably a maximum amplitude of the crosstalk transfer function 65, 69 is determined and compared to an amplitude threshold Thα. The amplitude threshold Thα may be constant and predefined or be determined depending on the amplitude a of the oscillations of the direct transfer function 63, 67, preferably depending on the maximum amplitude of the direct transfer function 63, 67. If this comparison 71 shows that the amplitude or maximum amplitude $α_x$ is equal or greater than the amplitude threshold Thα then step 73 is executed. Otherwise (N), step 75 is executed.

Determining whether the impairment is located close to the signal 78 source or close to the signal load 83 is based on the fact that the frequency dependency of the crosstalk depends on the location of the impairment 77. As discussed in more detail in the patent application EP 12305036, a received signal $V_r$ at the second end 18 of the line 13 corresponds to a superposition of the signal $V_s$ propagated along three different propagation paths, i.e. $V_r=V_{r1}+V_{r2}+V_{r3}$. Phasors can be used to represent the signals at the second end 18 of the line 13 as follows:

$$V_{s1}=e^{-\gamma_d \cdot (L_1+L_2)}$$

$$V_{s2}=e^{-(\gamma_d \cdot (L_1+L_2)+2 \cdot \gamma_c \cdot L_2)}$$

$$V_{s3}=e^{-(\gamma_d \cdot (L_1+L_2)+2 \cdot \gamma_c \cdot L_1)} \qquad (4)$$

The signal at the second end 18 of the line 13 can be written as $$V_s=e^{-\gamma_d \cdot (L_1+L_2)}(1+T \cdot e^{-2 \cdot \gamma_c \cdot L_1}+T \cdot e^{-2 \cdot \gamma_c \cdot L_2}). \qquad (5)$$

In the above equations, $\gamma_c$ and $\gamma_d$ are respectively the propagation constants for the common and differential modes. The real part of these constants is responsible for the signal attenuation while the imaginary part is related to the phase velocity. T is a factor describing the amplitude of the signals transferred between modes. Hence, the amplitude of the total signal consists in a decaying exponential (amplitude of the first term) modulated by an oscillating function (amplitude of the second term between parentheses).

Figure 5:
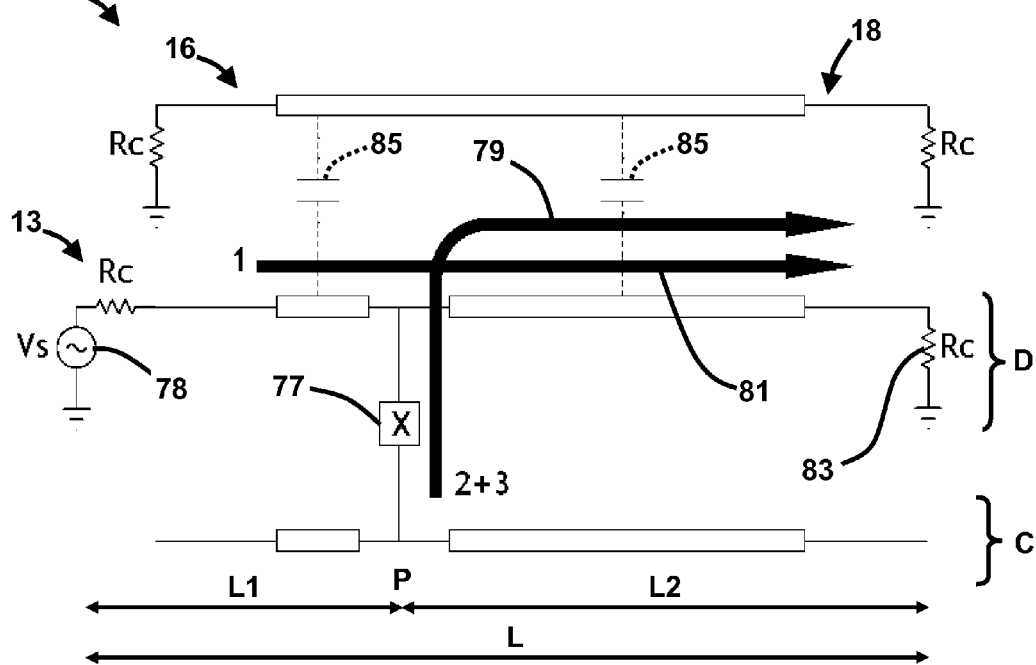
FIG. 5 shows a diagram of signal paths along a telecommunication line of the network shown in FIG. 1 according to a differential transmission mode and a common transmission mode and of crosstalk from the telecommunication line to a further telecommunication line.

FIG. 5 schematically shows the line 13 having an impairment 77 and the further line 36. Because the two lines 13, 36 run in parallel at least in sections, they are capacitively coupled with each other. This capacitive coupling leads to crosstalk between the lines 13, 36.

Furthermore a differential propagation mode D and a common propagation mode C are depicted for the impaired line 13. As the further line 36 has no impairment, only the differential mode is depicted. In the shown embodiment, a signal Vs is fed into the line 13, in differential mode D by signal source 78 and both lines are terminated by termination resistances $R_c$ in differential mode D. The termination resistance $R_c$ at the second end 18 of the lines 13, 36 form the signal load 83. No termination takes place in common mode C. The impairment 77 causes mode conversions that have the effect that the above-mentioned multiple propagation paths are introduced. In particular, the signals $V_{s2}$ and $V_{s3}$ that propagate along the paths that include mode conversions (arrow 79) interfere at the load location 83 with the direct signal $V_{s1}$ that goes directly from the first end 16 to the second end 18 (arrow 81) without being subject to mode conversion. The interference between these three signals creates oscillations in the transfer function.

As can be seen in FIG. 5, there is a coupling between the neighbouring line 13, 36, which leads to crosstalk. This coupling is typically a result of manufacturing imperfections of the lines 13, 36 or the binder 35. The strength of the coupling depends e.g. on a distance between the lines 13, 36 and a coupling length L, i.e. the total distance along which the lines 13, 36 are close to each other, e.g. extend within the same binder 35. The coupling between the lines 13, 36 may be capacitive, or at least, modelled as an equivalent capacitive coupling. The capacitive coupling is schematically illustrated in the form of discrete capacitances 85. However, the capacity is actually distributed along the section where the lines 13, 36 are located close to each other.

The signal $V_{s1}$ along the direct path 81 will couple with the further line 36 along the whole line length L=L1+L2. However, the coupling length of the signals $V_{s2}$, $V_{s3}$ that are subject to mode conversions due to the impairment 77 and that propagate along path 79, includes a section L2 between the impairment 77 and the second end 18 but not the section L1 between the first end 16 and the impairment 77. As a consequence, the crosstalk coefficients $g_{12}$ and $g_{21}$ between the line 13 and the further line 36 depend on the location P of the impairment 77.

If the impairment 77 is rather close to the second 18 (i.e. L2 <<L1), the coupling length L2 for signals $V_{s2}$ and $V_{s3}$ will be short compared to the coupling length L of signal $V_{s1}$. Hence, an amount of energy transferred from the line 13 to the further line 36 due to coupling mainly comes from the signal $V_{s1}$. Then the crosstalk from the line 13 observed on the further line 36 will be very similar to what would be observed if the line 13 was faultless.

However, if the impairment 77 is located close to the first end 16 of the line (i.e. L2 >>L1), the coupling length L and L2 of the three signals will be much more similar. In such a case, signals $V_{s2}$ and $V_{s3}$ will be significantly coupled to the further line 36 and the crosstalk transfer function $g_{21}$ will exhibit the typical oscillations caused by the interference of the three signals $V_{s1}$, $V_{s2}$, $V_{s3}$. These oscillations are also visible on the direct transfer function 63, 67 of the impaired line 13.

Hence, the amplitude $\alpha_x$ of oscillations found in the crosstalk transfer functions 65, 69 from the impaired line 13 towards its neighboring lines directly provides information on the ratio L2/ L1. The amplitude $\alpha_x$ of these oscillations in the crosstalk transfer function 65, 69 being much smaller than the amplitude $\alpha$ of the oscillations of the direct transfer function 63, 67 corresponds to L2 <L1, i.e. the defect is close to the second end 18, to which the signal load 83 is connected. Accordingly, a high amplitude $\alpha_x$ of the oscillations in the crosstalk transfer 65 57 functions corresponds to L2 >L1, i.e. the defect is close to the first end 16 to which the signal source 78 is connected.

In some embodiments, more than two lines of a vectoring group are considered in order to detect and/or localize the impairment 77. In one embodiment, the above-described test is performed successively on multiple further lines 36. Because these multiple further lines 36 are affected by the impairment 77 in at least essentially the same way, considering multiple further lines 36 increases the reliability of the method 45.

In an embodiment, the impairment detection decision (branch 55) and/or the impairment localization decision for selecting the most probable location P from multiple possible locations P1 , P2 (branch 71) is made for each pair of the line 13 and any further line 36 separately. A number Ndec of positive decisions (e.g. decision that the line 13 has an impairment 77 or decision that a given location is close to the signal source) may be counted. A ratio Ndec/Ntot of the positive decisions relative to the total number Ntot of decision is calculated and compared to a threshold, e.g. 0.5. The total number Ntot of decisions may be equal to the number of further lines 36. If the ratio Ndec/Ntot is equal to or greater than the threshold then an overall positive decision is made and the respective branches 55, 71 may switch to the arrows labeled with Y. Otherwise, the respective branches 55, 71 may switch to the arrows labeled with N.

Figure 6:
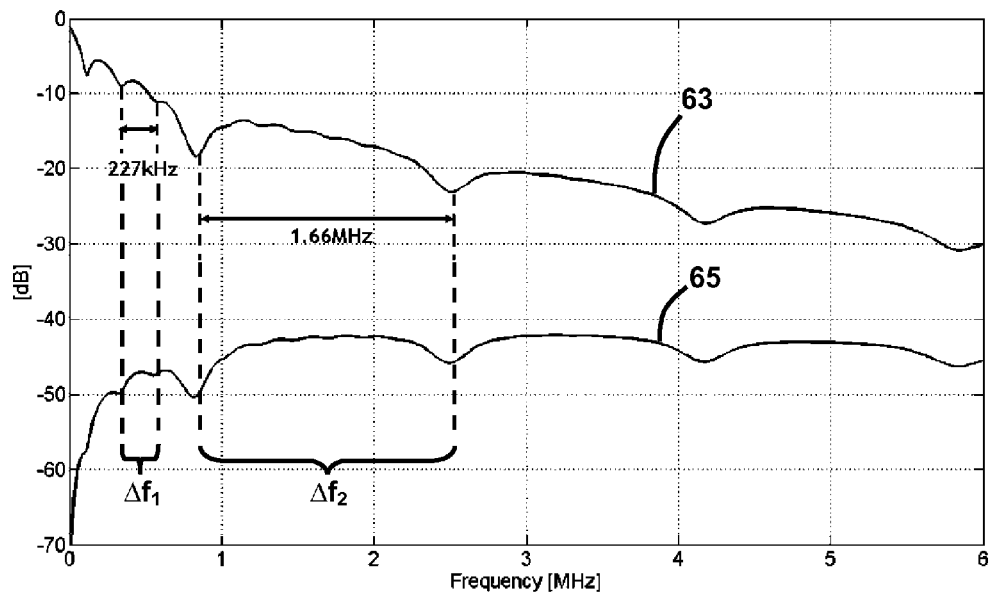
FIG. 6 shows a diagram similar to FIG. 3 in case of a short circuit to ground in the telecommunication line close to the signal source.
Figure 7:
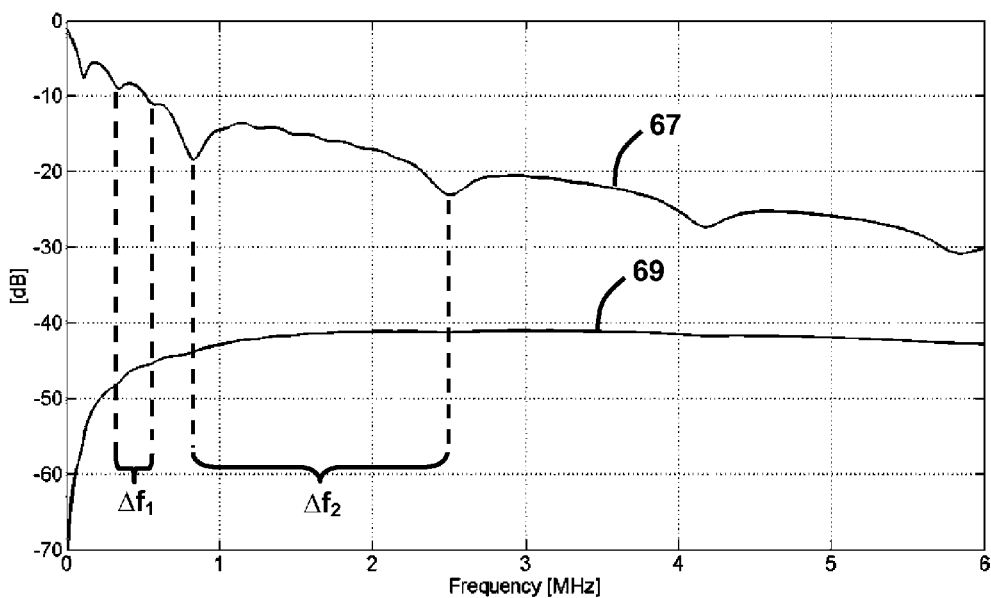
FIG. 7 shows a diagram similar to FIG. 6 in case of the short circuit to ground close to the signal load.

FIGS. 6 and 7 show diagrams of both the direct transfer function 63, 67 and the crosstalk transfer function 65, 69 in case of an impairment 77 in the form of a short circuit to ground of a wire of the line 13. FIG. 6 relates to an exemplary case where the impairment 77 is close to the signal source 78, which is located at the first end 16. FIG. 7 relates to the case where the impairment 77 is close to the signal load 83 located at the second end 18. As in the example shown in FIGS. 3 and 5, the method 45 described herein can estimate two possible locations P1, P2 of the impairment 77 by determining the periodicities $\Delta f_1$, $\Delta f_1$ of one of the transfer functions 63, 65, 67, 69, e.g. the direct transfer function 63, 67 and calculating the lengths L1, L2 as described above. In addition, the method 45, in particular the second branch 71, may select one of the possible locations P1, P2 as the most probable location P of the impairment 77 depending on whether the crosstalk transfer function 65, 69 has oscillations to a certain extent.

To sum up, the method 45 described herein not only uses data H log that characterize the direct transfer function 63, 67 but also the crosstalk data G, $g_{21}$ to estimate the location of the impairment. Using the crosstalk data G, $g_{21}$ allows to select the most probable location P among the possible locations P1, P2 of the impairment 77. Considering the whole crosstalk matrix data G, containing transfer functions $g_{i1}$ related to multiple further lines 36 further improves the reliability of the method 45.

The invention claimed is:

1. A method for locating an impairment within a telecommunication line, the method comprising:
    determining measurement data, the measurement data including,
        a crosstalk matrix having crosstalk transfer coefficients, the crosstalk transfer coefficients representing the crosstalk between the telecommunication line and at least one further telecommunication line within a same binder, diagonal elements of the crosstalk matrix each having a value of zero, and
        a direct transfer function data; and
    determining a location of the impairment within the telecommunication line by,
        determining a plurality of possible locations of the impairment based on the direct transfer function data,
        determining a ratio between an amplitude of each of a plurality of oscillations in the crosstalk transfer coefficients and an amplitude of each of a plurality of the oscillations in the direct transfer function data, and
        selecting one of said plurality of possible locations that is closest to a signal source as the location of the impairment if a correspondingly determined ratio is greater than or equal to a threshold.

2. The method according to claim 1, wherein the determining the measurement data comprises:
    requesting the crosstalk transfer coefficients from a network element.

3. The method according to claim 1, wherein the determining the location of the impairment comprises:
    detecting the oscillations in the crosstalk transfer coefficients; and
    estimating the location of the impairment based on said detected oscillations.

4. The method according to claim 1, wherein the direct transfer function data characterizes a direct transfer function between the telecommunication line and the at least one further telecommunication line.

5. The method according to claim 4, further comprising:
    determining that the impairment is present in the telecommunication line if at least one oscillation in the direct transfer function is detected.

6. The method according to claim 4, wherein the determining the location of impairment includes:
    determining at least one periodicity interval of at least one oscillation in the direct transfer function; and
    estimating the location based on the determined periodicity interval.

7. The method according to claim 1, wherein the selecting further includes selecting one of the plurality of possible locations that is closer to the signal source of a signal fed into the telecommunication line if a corresponding amplitude of oscillation is greater than or equal to a threshold.

8. A device configured to locate an impairment within a telecommunication line, the device comprising:
    a memory having computer readable instructions stored therein; and
    a processor configured to execute the computer-readable instructions stored in the memory to,
        determine measurement data, the measurement data including, a crosstalk matrix having crosstalk transfer coefficients, the crosstalk transfer coefficients representing crosstalk between the telecommunication line and at least one further telecommunication line within a same binder, diagonal elements of the crosstalk matrix each having a value of zero, and
a direct transfer function data; and
determine a location of the impairment within the telecommunication line by,
determining a plurality of possible locations of the impairment based on the direct transfer function data,
determining a ratio between an amplitude of each of a plurality of oscillations in the crosstalk transfer coefficients and an amplitude of each of a plurality of the oscillations in the direct transfer function data, and
selecting one of said plurality of possible locations that is closest to a signal source as the location of the impairment if a correspondingly determined ratio is greater than or equal to a threshold.

9. The device according to claim 8, wherein the device is,
a component of a network element connected to the telecommunication line, the network element being one of an access node, and a customer premises node, or
a component of a monitoring station configured to communicate with the network element.

10. A non-transitory computer-readable medium including computer-readable instructions, which when executed by a processor, cause the processor configured to locate an impairment within a telecommunication line by:
determining measurement data, the measurement data including,
a crosstalk matrix having crosstalk transfer coefficients, the crosstalk transfer coefficients representing crosstalk between the telecommunication line and at least one further telecommunication line within a same binder, diagonal elements of the crosstalk matrix having a value of zero, and
a direct transfer function data; and
determining a location of the impairment within the telecommunication line by,
determining a plurality of possible locations of the impairment based on the direct transfer function data,
determining a ratio between an amplitude of each of a plurality of oscillations in the crosstalk transfer coefficients and an amplitude of each of a plurality of the oscillations in the direct transfer function data;
selecting one of said plurality of possible locations that is closest to a signal source as the location of the impairment if a correspondingly determined ratio is greater than or equal to a threshold.

* * * * *